Nov. 19, 1940.    G. M. DEMING    2,222,171

CARBIDE FEED MECHANISM

Filed Dec. 9, 1938

INVENTOR
George M. Deming
BY
ATTORNEY

Patented Nov. 19, 1940

2,222,171

UNITED STATES PATENT OFFICE 2,222,171

CARBIDE FEED MECHANISM

George M. Deming, East Orange, N. J., assignor to Air Reduction Company, Incorporated, New York, N. Y., a corporation of New York Application December 9, 1938, Serial No. 244,724

13 Claims. (Cl. 48—53.3)

This invention relates to feed mechanism for supplying carbide from a hopper to the gas generating chamber in carbide-to-water type acetylene generators.

It is an object of the invention to provide improved automatic feed mechanism for controlling the supply of carbide from the hopper. In order to maintain a reasonably constant pressure in the regulator, it is essential that the feed mechanism not only respond promptly to changes in pressure, but that the carbide when fed from the hopper flows at a gradual but substantially continuous rate. Very high quality regulation of the gas pressure in the generator has been obtained by feed plates which rotate and also move toward and from the hopper mouth. The rotation of the plate has been by power, large clockwork motors being used for the purpose.

Another object of the invention is to provide simpler and less expensive mechanism for imparting to a carbide feed valve a combination of rotary movement and displacement toward and from the hopper mouth.

In accordance with one feature of this invention a carbide feed plate is moved toward and from the hopper mouth in accordance with fluctuations in the gas pressure, and the plate is rotated to displace carbide when the pressure in the generator is decreasing but not when it is increasing. This operation obtains an improved control of the carbide feed and maintains a more nearly uniform gas pressure in the generator.

Another feature of the invention intended for portable acetylene generators relates to an auxiliary closing plate which is located beneath the carbide feed plate and can be moved into a position where it protects the feed plate from being splashed and coated with sludge while the generator is being transported from one place to another without draining the water.

Other objects, features and advantages of the invention will appear or be pointed out as the specification proceeds.

In the accompanying drawing, forming a part hereof:

Figure 1:
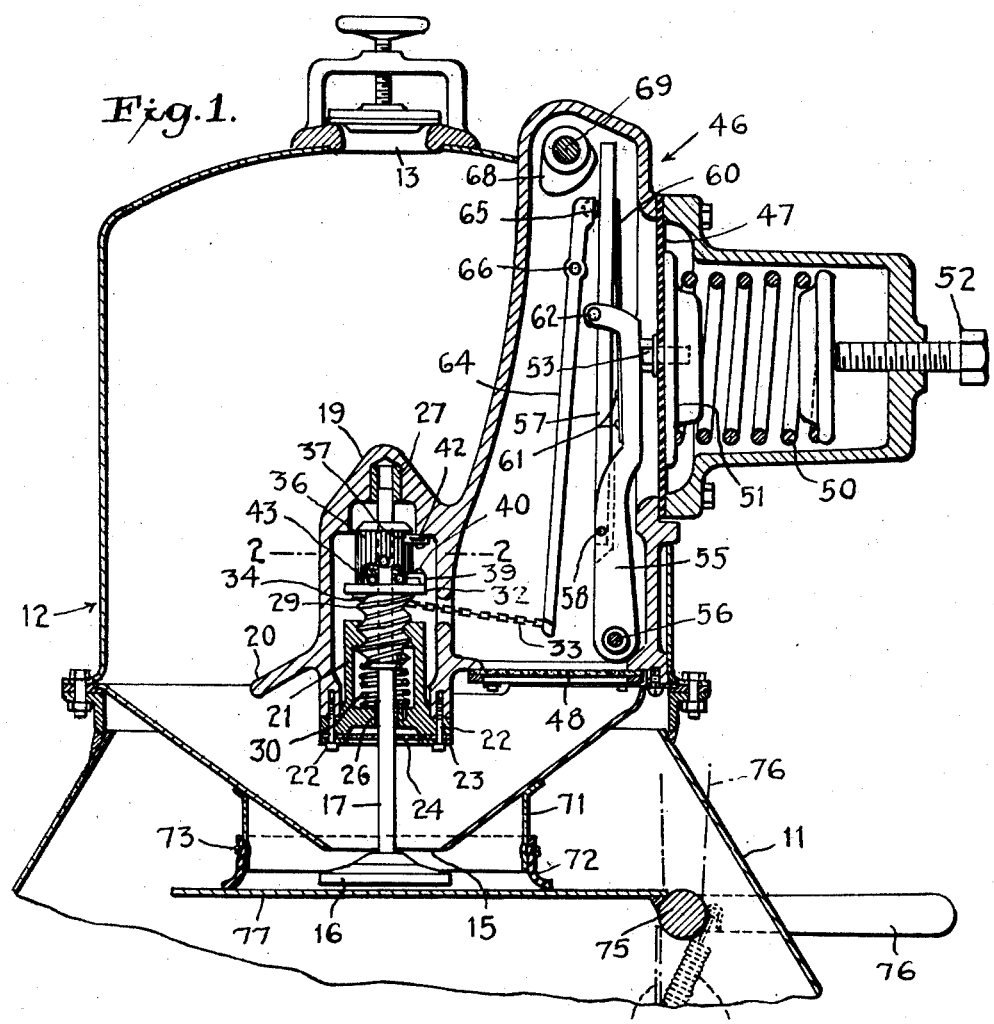
Fig. 1 is a view, mostly in section, showing the upper part of a portable acetylene generator embodying the invention.
Figure 2:
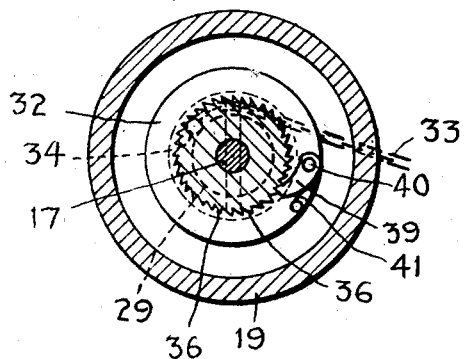
Fig. 2 is an enlarged sectional view taken on the line 2—2 of Fig. 1.

The generator is of the carbide-to-water type and includes a lower section or generating chamber 11 which is partially filled with water. The upper section of the generator is the carbide chamber or hopper 12 and has a filling opening 13 at the top.

The carbide hopper 12 has a circular mouth 15 below which is a feed plate 16 of slightly greater diameter than the mouth 15. The feed plate is secured to and supported by a stem 17.

Within the carbide hopper there is a housing 19, on which is cast an anti-bridging cone 20 located centrally above the hopper mouth 15. A support 21 fits over the lower end of the housing 19 and extends part-way up into the housing. Screws 22 connect the support 21 with the housing 19. These screws also hold a washer 23 against a disk 24, which is made of felt or other material suitable as a shield for keeping carbide dust out of the housing 19.

The stem 17 passes through the disk 24 and has a vertical sliding movement in a bearing 26 in the support 21 and in another bearing 27 in the top wall of the housing 19. The stem 17 fits freely through an axial opening in a member 29 that threads through the upper end of the support 21.

A spring 30 has one end anchored in the bottom wall of the support 21 and the other end anchored in the lower end of the threaded member 29. This spring 30 is wound and its torsion creates a constant force tending to rotate the threaded member to the right. Such rotation, when it occurs, causes the threaded member 29 to move upward.

At the upper end of the threaded member 29 there is a collar 32. A flexible connection comprising a chain 33 has its end portion wrapped around the threaded member 29 and lying in the valleys of the threads. The extremity of the chain 33 is anchored to the collar 32 at the upper end of the threaded member 29 by a pin 34 fixed in the collar 32. The chain 33 is wrapped around the threaded member 29 in such a direction that pulling the chain turns the threaded member 29 to the left and causes it to move downward against the torsion of the spring 30.

A ratchet 36 is fastened to the stem 17 of the feed plate 16. A holding pawl 37 supported from the housing 19 engages the ratchet 36 and prevents the ratchet from rotating to the right. Since the ratchet is secured to the stem 17, and this stem moves up and down to control the displacement of the feed plate 16, the teeth of the ratchet 36 are made somewhat wider than the full travel of the stem 17 so that the pawl 37 will engage the ratchet regardless of the vertical movement of the ratchet as it shifts up and down with the stem 17.

An operating pawl 39 is connected by a pivot 40 to the collar 32 at the upper end of the threaded member 29, and this pawl is held against the ratchet 36 by a spring 41. When the chain 33 causes the threaded member 29 to turn to the left and move downward, the operating pawl 39 engages the ratchet 36 and forces the ratchet, the stem 17, and the feed plate 16 to rotate. When the collar 32 turns in the opposite direction, the pawl 39 slides over the ratchet teeth without imparting any rotation to the ratchet 36. The holding pawl 37 acts as a positive lock against reverse rotation of the ratchet.

The holding pawl 37 is held against the ratchet 36 by a spring 42, and the pressure of this spring causes the pawl 37 to act as a brake on the ratchet when the ratchet is being turned by the operating pawl 39. The extent to which the pressure of the spring 42 increases as the holding pawl 37 is displaced by a ratchet tooth depends upon the design of the spring.

The spring 42 is preferably of such design that it builds up pressure rapidly when the holding pawl is displaced by a ratchet tooth and applies a progressively greater braking load to the ratchet until the force rotating the ratchet turns the ratchet far enough to carry the tooth past the holding pawl. This sudden release of the brake load causes the ratchet to move spasmodically forward.

The intermittent braking of the ratchet as each tooth displaces the holding pawl causes a jerky rotation of the feed plate and expedites the flow of carbide from the hopper.

The feed plate 16 and its stem 17 are supported by the ratchet 36, which is in turn supported by the collar 32 at the top of the threaded member 29. In order to reduce friction during the up-stroke of the stem 17, when the collar 32 is turning but the ratchet 36 is not, there is an anti-friction bearing 43 between the collar 32 and ratchet 36, this bearing being mostly enclosed in a recess in the bottom face of the ratchet.

When the threaded member 29 moves downward, the support for the ratchet is withdrawn, and the ratchet, the stem 17, and the feed plate 16 move down under their own weight and the pressure of the carbide on the feed plate.

The apparatus for moving the chain 33 is enclosed in a housing 46. A flexible diaphragm 47 forms a partition across this housing and divides the housing into a pressure chamber on the left side of the diaphragm and a spring chamber on the right. Gas in the generator passes through the felt dust-filter 48 and exerts pressure against the left side of the diaphragm.

An adjusting spring 50 exerts pressure against the right side of the diaphragm through a diaphragm plate 51. The tension of the spring 50 is controlled by a screw 52 that threads through an end wall of the housing. A stud 53 extends through the center of the diaphragm 47 and threads into the diaphragm plate 51. This diaphragm, subject to the generator gas pressure on one side, with the spring 50 loading it from the other side, comprises a motor for moving the feed plate.

A lever 55 has a fulcrum pivot 56 connected to the housing 46. This lever contacts with the stud 53. An auxiliary lever 57 is connected with the lever 55 by a fulcrum pivot 58. A leaf spring 60, secured to the lever 55 by screws 61, holds the auxiliary lever 57 against a limit pin 62 that extends across a bifurcated upper end of the lever 55.

An intermediate lever 64 has its lower end connected with the chain 33 and has a ball 65 at its upper end which contacts with the auxiliary lever 57. A pivot pin 66 fastened to the housing 46 is the fulcrum for the intermediate lever 64.

In normal operation of the generator the feed plate 16 never moves far enough away from the hopper mouth to permit free feeding, that is, feeding of carbide without agitation of the feed plate. If the gas pressure in the generator drops more than a given value, for example 1½ lbs., below the pressure which the tension of the spring 50 is adjusted to maintain, the lever 55 is moved back far enough to bring the limit pin 62 against the intermediate lever 64. Further movement of the lever 55 by the spring 50 reverses the movement of the intermediate lever 64 and causes this intermediate lever to move clockwise with falling gas pressure instead of counter-clockwise. When the gas pressure is reduced far below any normal pressure fluctuation, therefore, the feed plate, instead of opening progressively further into a feed feeding position as the pressure goes lower, moves back toward closed position. The spring 50 exerts a given minimum pressure, for example a pressure equivalent to 4 lbs. per sq. in. gas pressure against the diaphragm 47, and this is enough to close the feed plate when there is little or no pressure in the generator.

There is a cam 68 on a shaft 69 extending across the upper end of the housing 46. When the generator is to be moved from one location to another, the carbide feed plate can be held in closed position by turning the cam 68 until it pushes the auxiliary lever 57 back against the tension of the spring 60. This displacement of the auxiliary lever 57 permits the ball end of the intermediate lever 64 to move to the right and the chain 33 to wrap up on the threaded member 29 so that the spring 30 can raise the threaded member 29 and with it the ratchet 36, stem 17, and feed plate 16 until the feed plate is entirely closed. As long as the cam 68 holds back the auxiliary lever 57, the spring 30 will hold the feed plate closed against the bottom of the hopper.

When the position of the feed plate 16 is controlled by the pressure of the limit pin 62 against the intermediate lever 64, the feeding of carbide to reestablish the generator operation is accomplished by manipulating the cam 68.

When the generator is transported without draining the generating chamber 11, water in that chamber splashes and the feed plate may become badly sludged unless some means is employed to protect it. In the preferred embodiment of the invention there is an annular skirt 71 extending downward from the hopper bottom. A resilient rubber lip 72 is attached to the lower portion of the skirt 71 and extends below the level of the feed plate when in open position.

The lip 72 is attached to the skirt 71 by binding wire 73 which is wrapped around the lip and depresses the rubber into an annular groove in the skirt.

A shaft 75 extends across the generating chamber and through one side of the generator. The extending end of this shaft is connected with a handle 76. A splash plate 77, of large enough area to completely cover the space enclosed by the skirt 71, is connected with the shaft 75 along one edge of the plate.

The shaft 75 is supported by bearings at such a height that when the splash plate 77 is in a horizontal position it contacts with the lip 72 along the entire length of the lip and effectively encloses the feed plate so that it can not be sludged by water splashing in the generating chamber.

When the generator is to be used at its new location, the handle 76 is moved to turn the shaft 75 through 90° and shift the splash plate into a vertical position out of the path of carbide falling from the feed plate. A tension spring 79 attached at one end to the handle 76 and anchored at the other end to the wall of the generator moves from one side to the other of the axis of the shaft 75 during the 90° movement of the handle, and this spring, therefore, serves to hold the splash plate in either its horizontal or vertical position.

The operation of the feed plate mechanism is as follows:

When the generator pressure begins to decrease below that for which the spring 50 is adjusted, the pressure against the left side of the diaphragm 47 drops and the diaphragm moves toward the left under influence of the pressure from the spring 50. This movement of the diaphragm is transmitted through the stud 53, lever 55, spring 60, and auxiliary lever 57 to the intermediate lever 64, which is rocked counter-clockwise about its fulcrum pin 66.

This counter-clockwise movement of the auxiliary lever 57 pulls the chain 33 so that it unwraps from the threaded member 29 and turns the threaded member against the torsion of the spring 30 in a direction to screw it downward in the support 21. The lowering of the collar 32 causes the ratchet 36, stem 17, and feed plate 16, which are supported by the collar 32, to move downward and increase the displacement of the feed plate 16 from the mouth of the hopper. This increases the opening for carbide discharge from the hopper mouth.

The threaded member 29 and collar 32 rotate during their downward movement, and this rotation is transmitted through the pawl 39, to the ratchet 36 and feed plate 16. The rotation causes a more continuous discharge of carbide from the feed plate.

As more carbide is discharged from the hopper at a substantially continuous rate which increases as the feed plate displacement increases, gas is generated more rapidly in the generator until the pressure begins to rise.

As soon as the pressure begins to rise, the increased pressure will push the diaphragm 47 to the right against the tension of the spring 50. This movement of the diaphragm permits the lever 55, spring 60, and auxiliary lever 57 to move toward the right, and during such movement the intermediate lever 64 can rock clockwise about its fulcrum pivot 66. The spring 30 unwinds and screws the threaded member 29 upward and causes the chain 33 to wrap around the threaded member as far as the intermediate lever 64 will permit. The distance that the chain 33 can pull the lower end of the intermediate lever 64 depends upon the extent of the recession of the diaphragm 47, and is therefore controlled by the gas pressure.

The rotation of the feed plate stops as soon as downward movement of the threaded member 29 stops, and there is no rotation of the feed plate during its upward movement because the pawl 39 passes across the teeth of the ratchet during such upward movement. This arresting of rotary movement of the feed plate causes an immediate reduction or stoppage of the carbide discharge as soon as pressure stops falling in the generator.

The preferred embodiment of the invention has been described, but changes and modifications made be made, and some features of the invention may be used without others.

I claim:

1. In an acetylene generator, a carbide hopper, a generating chamber beneath the hopper, a feed plate at the bottom of the hopper for controlling the discharge of carbide from said hopper into the generating chamber, and mechanism for rotating the feed plate, said mechanism including means responsive to the gas pressure in the generator, and connections between said means and the feed plate through which movement of said means in response to a decrease in gas pressure causes rotation of the feed plate in one direction, and means for preventing rotation of the feed plate during movement of the gas pressure responsive means in response to increasing pressure in the generator.

2. In an acetylene generator having a carbide hopper with a mouth and a feed plate for controlling the discharge of carbide from the hopper mouth, means responsive to the gas pressure of the generator, connections through which the gas responsive means cause changes in the displacement of the feed plate with respect to the hopper, means for causing the feed plate to rotate during its movement away from the hopper mouth, and means for preventing rotation of the feed plate when it is moving toward the hopper mouth.

3. The combination in an acetylene generator having a carbide hopper, of a feed plate movable toward and from the hopper and rotatable about its line of movement toward and from the hopper, apparatus responsive to variations in the gas pressure in the generator, motion-transmitting connections between said apparatus and the feed plate for changing the displacement of the feed plate from the hopper mouth, means operated by said connections for causing said feed plate to rotate during its movement away from the hopper mouth, with the peripheral rotary displacement of the feed plate several times as great as the change in the feed plate displacement from the hopper mouth, and means for preventing rotation of the feed plate when it is moving closer to the hopper mouth.

4. In an acetylene generator, the combination with a carbide hopper, a feed plate that controls the discharge of carbide from the hopper, and a stem connected to the feed plate, of mechanism for rotating the feed plate comprising a gas-pressure operated device, and connections through which motion of said device is transmitted to the stem of the feed plate, said connections including a pawl and ratchet one of which is connected with the feed plate stem for rotating the stem when said gas-pressure operated device is moving in one direction only.

5. In an acetylene generator including a carbide hopper, and a feed plate that moves toward and from the hopper and has also a rotary movement, for controlling the discharge of carbide from the hopper, the improvement which comprises a single operating motor, and motion-transmitting connections between the motor and the feed plate through which both motions of the feed plate are transmitted to said feed plate from the single operating motor, said connections including means for preventing rotary movement of the feed plate to one direction.

6. An acetylene generator including a carbide hopper, a generating chamber below the hopper, a feed plate that is movable toward and from the hopper to control the passage of carbide from the hopper to the generating chamber, pressure-operated means including a diaphragm exposed to the gas pressure of the generator, motion-transmitting means operatably connected with the diaphragm and the feed plate for transmitting movement of the diaphragm to the feed plate to change the displacement of the feed plate from the hopper, and mechanism operated by the movement of the motion-transmitting means when moving in one direction only, for causing rotation of the feed plate.

7. The combination with an acetylene generator carbide feed plate, of pressure-responsive means, motion-transmitting connections between said pressure-responsive means and the feed plate for raising and lowering said plate to control the carbide feed, said connections including a member which is threaded throughout at least a portion of its length and operatably connected with the feed plate, a flexible connector fastened at one end to said member and at least partially wrapped around said member in such a manner that pulling of the flexible connector rotates said member, an operative connection between the other end of the flexible connector and the pressure-responsive means, and a structure through which said member threads so that rotation of said member causes its displacement in a direction to control the carbide feed.

8. In an acetylene generator having a carbide hopper, a feed plate for controlling the discharge of carbide from said hopper, a threaded member associated with the feed plate, a support through which the threaded member screws, motion transmitting connections through which the spiral movement of said threaded member causes reciprocating movement of the feed plate toward and from the hopper, and apparatus operated by the gas pressure of the generator for effecting rotation of the threaded member in said support.

9. In an acetylene generator having a carbide hopper, a feed plate for controlling the discharge of carbide from said hopper, a support, a member that passes through and is threaded in said support, motion transmitting connections through which spiral movement of said member along its threads causes reciprocating movement of the feed plate toward and from the hopper, pawl and ratchet means associated with the feed plate and effective to rotate the feed plate, and pressure-operated means for rotating the threaded member and actuating said pawl and ratchet means, said pressure-operated means being subject to the gas pressure in the generator.

10. An acetylene generator including a gas generating chamber the lower part of which is filled with water, a carbide hopper at the upper end of the generating chamber, a stationary support, a screw threaded through said support with the axis of said screw in alinement with the mouth of the hopper, a wound spring anchored at opposite ends to the screw and stationary support and wound in a direction to urge the screw to move upward, means for rotating the screw to move it downward including a chain, one end of which wraps around the screw in the valleys of the threads and has its extremity anchored to said screw, a collar carried by the screw at its upper end, a feed plate below the mouth of the hopper, a stem supporting the feed plate and extending upward from the feed plate, and extending freely through said screw along the axis of the screw, bearings at the upper end and intermediate the ends of said stem in which the stem slides to move the feed plate toward and from the hopper mouth, a ratchet on the valve stem above the collar, a pawl carried by the collar and engaging the ratchet in a direction to rotate the ratchet when the screw is moving downward, a pin connecting the ratchet securely to the stem immediately above the collar, anti-friction bearing means between the collar and the bottom face of the ratchet, and control apparatus comprising a spring-loaded diaphragm that is moved against the tension of the spring by the gas pressure in the generating chamber, and a leverage system through which movement of the diaphragm by its loading spring, as gas pressure against the diaphragm decreases, pulls the chain and turns the screw in a direction to move it downward.

11. In an acetylene generator, a carbide hopper, a feed plate movable toward and from the hopper for controlling the flow of carbide from the hopper, pressure-operated means for shifting and controlling the displacement of the feed plate from the hopper, and means for agitating the feed plate including apparatus for rotating the feed plate and intermittent retarding means for causing recurring variation in the rate of rotary movement during the operation of said apparatus.

12. In an acetylene generator having a carbide hopper, a feed plate movable toward and from the hopper mouth to control the flow of carbide, and mechanism connected with the feed plate and operated by the gas pressure in the generator for increasing the displacement of the feed plate from the hopper mouth as the gas pressure decreases, the improvement which comprises apparatus responsive to changes in the generator pressure for reversing the movement of the feed plate and decreasing its displacement from the hopper mouth when the generator pressure drops below a predetermined value.

13. In an acetylene generator, a carbide hopper, a feed plate, apparatus operatably connected with the feed plate and responsive to the gas pressure in the generator for changing the displacement of the feed plate in accordance with variation in the gas pressure, and means for preventing free feeding of carbide from the hopper including a device connected with said apparatus for reversing the direction of the displacement movement of the feed plate when the apparatus displaces said feed plate beyond a predetermined limit.

GEORGE M. DEMING.